Sept. 28, 1965    E. BOSSHARD    3,208,917
FUEL ELEMENT FOR A NUCLEAR REACTOR
Filed Feb. 21, 1961    2 Sheets-Sheet 1
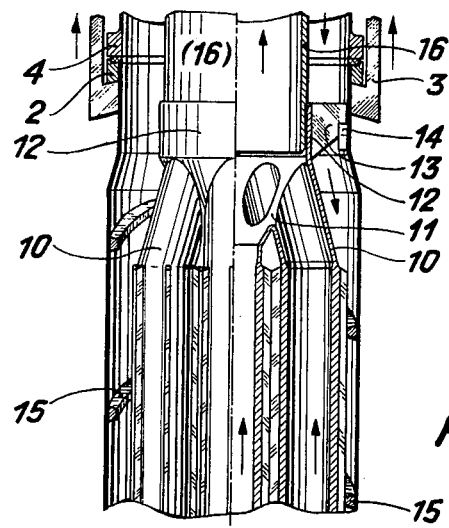
Fig. 1
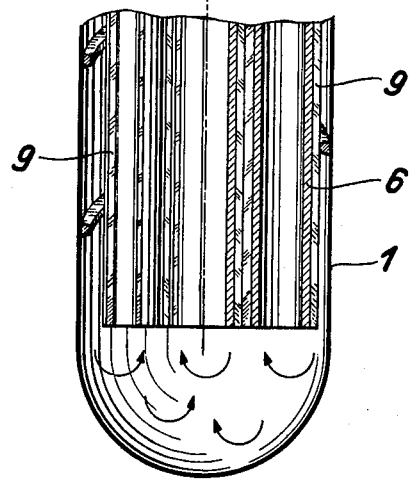
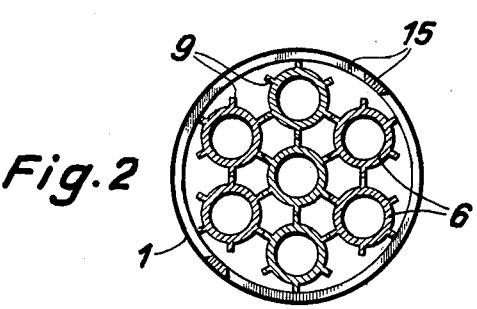
Fig. 2
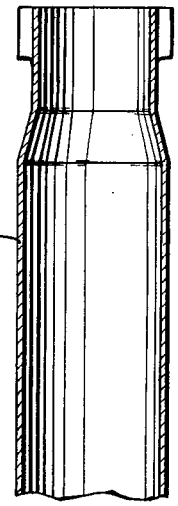
Fig. 6
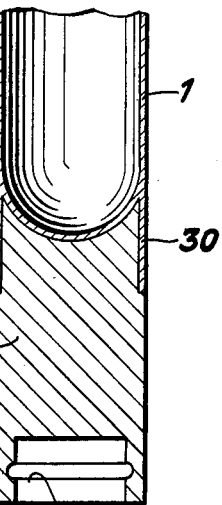
INVENTOR.
ERNST BOSSHARD
BY K. A. Meyer
ATTORNEY.

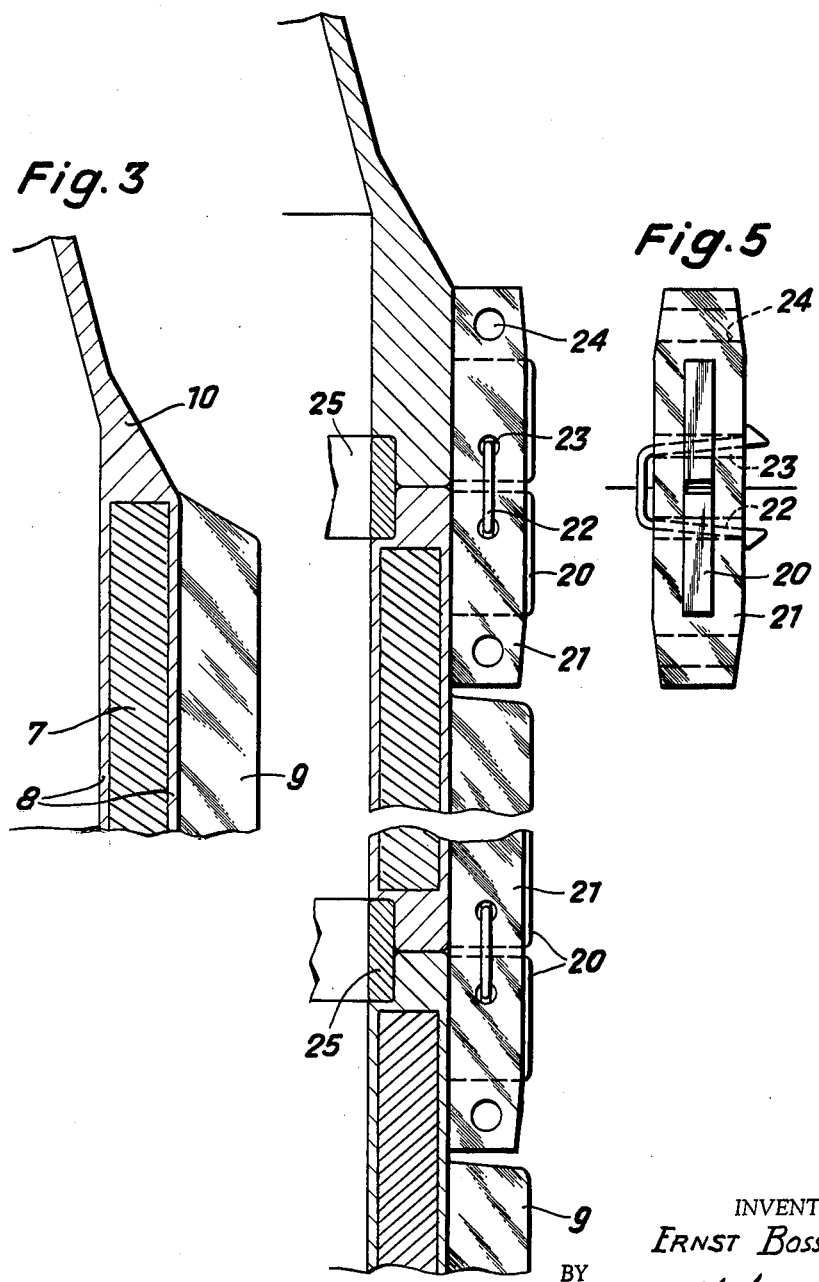

United States Patent Office 3,208,917
Patented Sept. 28, 1965

3,208,917
FUEL ELEMENT FOR A NUCLEAR REACTOR
Ernst Bosshard, Winterthur, Switzerland, assignor to Sulzer Freres, S.A., Winterthur, Switzerland, a corporation of Switzerland
Filed Feb. 21, 1961, Ser. No. 114,576
Claims priority, application Switzerland, Mar. 15, 1960, 2,895/60
9 Claims. (Cl. 176—68)

The present invention relates to a fuel element for a nuclear reactor comprising an oblong can or casing closed at one end and containing a plurality of tubes made of material containing fissionable material and conducting a coolant removing heat from the fuel element for transporting the heat to a heat consumer.

Fuel elements for nuclear reactors are known having a plurality of fuel tubes with a coolant conducting tube embedded in each fuel tube, said fuel tubes being placed in an oblong can or casing closed at one end whereby the coolant, for example, water under pressure or a liquid metal, enters one half of the number of tubes in a can at the open end of the can and leaves the tubes adjacent to the closed end of the can whereupon the coolant enters the other half of the number of tubes adjacent to the closed end of the can and is returned to the open end of the can. In these fuel elements the spaces between the fuel tubes and/or between the fuel tubes and the inside of the can are filled with a heat insulating or other suitable substance or are evacuated.

Fuel elements of the type described in the paragraph next above require a great number of tube connections which must be tight against, for example, the high pressure of the cooling water. These fuel elements have relatively small surfaces which are in contact with the coolant so that a great flow velocity of the coolant is needed to effect the desired heat transfer and, consequently, much power is required to circulate the coolant at the needed velocity.

The aforesaid disadvantages are particularly noticeable if a vapor or steam is used as the coolant.

It is an object of the present invention to provide a fuel element which avoids or at least substantially reduces the aforedescribed disadvantages. This object is attained by providing a fuel element comprising an oblong can closed at one end and containing a plurality of fuel tubes through at least a number of which a coolant flows in one direction, the coolant flowing in the opposite direction through at least some of the spaces between the fuel tubes and/or between the fuel tubes and the inside of the can.

With the aforesaid arrangement the entire interior of the can is under the pressure of the coolant and not more than a single high pressure seal is required. The connections of the fuel tubes inside the can need not be absolutely tight and the tubes may simply be telescoped one into the other. The arrangement also provides a heat transfer surface not only inside the fuel tubes but a much more effective heat transfer surface at the outside of the fuel tubes.

It has been proposed before to cool not only the inside but also the outside of a tube made of fissionable material and forming a fuel element in a nuclear reactor. The invention, however, does not only provide for adding the outside surface of a fuel tube to the inside surface to correspondingly increase the total heat transfer surface, but provides for placing a plurality of fuel tubes within a can whereby passages are formed between the fuel tubes and between the fuel tubes and the can which passages have the general cross-sectional configuration of triangles having arcuate sides. Passages or channels of this type produce a very vigorous turbulence of the coolant and have been found to effect an unexpected great rate of heat reception by the coolant. In the fuel element according to the invention the increase of heat transfer does not simply correspond to the increase of surface in contact with the coolant, but amounts to a multiple of the surface increases.

The cooling effect can be further increased by sheathing the fuel tubes in corrosion-proof material which forms longitudinal ribs at the outside of the tubes. According to the invention ribs of different tubes are preferably abutting or otherwise engaging one another to form a tube package having a plurality of coolant passages extending substantially longitudinally of the tube package. The tube package is preferably so arranged that it can be inserted as a unit into the can through the open end thereof.

In the aforedescribed fuel element the coolant is preferably conducted first through passages between the fuel tubes and between the fuel tubes and the can toward the closed end thereof where the flow direction of the coolant is reversed and wherefrom the coolant flows through the interior of the fuel tubes to leave the fuel tubes substantially where the coolant enters the can.

The invention provides for dividing the fuel tubes and the package formed thereby into a plurality of individual sections and for disconnectably connecting the individual sections.

A further object of the invention resides in the provision of a fuel element for a nuclear reactor which element includes a can or casing having a closed end and a plurality of fuel tubes placed in the can, a foot member being connected to the outside of the closed end of the can and including means adapted to be engaged by means for transporting the can, for example, for replacing the entire fuel element or parts thereof. This foot member is preferably made of neutron absorbing material, for example, material containing boron.

The novel features which are considered characteristic of the invention are set forth with particularity in the appended claims. The invention itself, however, and additional objects and advantages thereof will best be understood from the following description of embodiments thereof when read in connection with the accompanying drawing wherein:

The right half of FIG. 1 is a longitudinal sectional view of a fuel element according to the invention and the left half of FIG. 1 is an elevation of the fuel element with a portion of the can removed.

FIG. 2 is a cross-sectional illustration of the fuel element shown in FIG. 1.

FIGS. 3 and 4 are longitudinal sectional views on a larger scale of a portion of a fuel tube forming part of the fuel element shown in FIG. 1.

FIG. 5 is a front elevation of a part of a fuel tube which part is shown in side elevation in FIG. 4.

FIG. 6 is a longitudinal sectional view of a modified can of a fuel element according to the invention.

Referring more particularly to FIGS. 1 and 2 of the drawing, numeral 1 designates a cylindrical can or casing which is closed at one end and which is provided with a collar 2 at the outside of the open end. The collar 2 is adapted to be engaged by hooks 3 for pulling the can and pressing the collar 2 against the end of a tube 4. The can 1 contains seven tubes 6 containing fissionable material and provided with axial outside fins 9. Adjacent fins of different tubes 6 abut one another or are connected so that the tubes form a package. A hollow cone-shaped element 11 is provided inside the open end of the can 1, the outer tubes 6, i.e., the tubes which are opposite the inside wall of the can 1, being connected to the member 11 by inclined tube portions 10. The center tube 6 is connected to the apex of the cone 11.

The wide upper end of the cone 11 continues into a short cylindrical portion 12. The latter is provided with radial arms 13. The center tube and the tubes 6 connected to the cone 11 by the inclined tube portions 10 and the cylindrical portion 12 with the radial arms 13 form an insert which rests on U-shaped supports 14 mounted in the open end of the can 1, the arms 13 being inserted in the slots formed by the U supports 14. Lateral movement of the insert in the can is prevented by helical ribs 15 mounted to the inside of the can. When the fuel element shown in FIGS 1 and 2 is in operating position the end of a tube 16 mounted within the tube 4 by means not shown, extends in telescope fashion into the cylindrical portion 12. A great number of fuel elements according to FIGS. 1 and 2 are placed in the moderator portion of a nuclear reactor. The heat generated by the fuel tubes 6 is transferred to a heat carrier which enters the element through the annular space between the tubes 4 and 16, flows in downward direction along the outside of the tubes 6 and is thoroughly mixed at the closed end of the can 1 before the heat carrier or coolant enters the inside of the tubes 6 for upward flow therethrough to the cone 11 wherefrom the heated coolant is removed through the tube 16.

With the aforedescribed fuel element only one high pressure seal is required, namely the seal between the collar 2 and the end of the tube 4. A sliding seal is provided between the outside of the tube 16 and the inside of the cylindrical portion 12 which seal may consist in a rather snug fit of the tube 16 in the cylindrical portion 12, or which may be in the form of a conventional labyrinth packing, or may be formed by annular rubber elements. Since the difference between the pressure of the coolant entering the can and the pressure of the coolant leaving the can is small, leakage at the seal between the members 12 and 16 is negligible.

FIG. 3 shows the upper part of a nuclear fuel tube 6. The tube consists of fissionable material 7 which is covered on both sides by a corrosion-resisting protective layer 8, for example, of beryllium, which is connected, for example by welding, to an inclined tube portion 10 made of the same material or of different material as the protective layers 8. The outside layer 8 is provided with axial fins 9 which may be produced in a single drawing operation with the tube 6 made of fissionable material 7 and the protective layers 8.

FIG. 4 is a longitudinal section of a fuel tube forming part of a tube package which is inserted in a can. The fuel tubes are subdivided into a plurality of relatively short tube sections whereby the subdivision of all tubes belonging to the same package is made in common radial planes so that the entire tube package forming the insert is subdivided into a plurality of axially relatively short sections.

The portions of the fuel tubes which are close to the center of the reactor are spent much sooner than portions which are distant from the center. By subdividing the length of the fuel tubes the more quickly spent tube portions or package sections formed thereby can be periodically exchanged. The individual sections are kept in alignment by annular members 25 made of neutron-absorbing material or of materials containing neutron-absorbing substances, for example of steel containing boron, in order to reduce the heat generation at the ends of the fuel tube sections.

The individual sections are locked together by lock elements 21. Parts of the fins 9 are removed to leave lugs 20 at the ends of the fuel tube sections which lugs extend into a corresponding slot in the lock element 21. The elements 21 are secured to the lugs 20 by means of resilient U-shaped members 22 extending through bores 23 in the element 21 and being provided with barbs at the ends. The lock elements are provided with bores 24 for receiving holding means, not shown, when the tube packages are separated and as long as the lock elements are not on the lugs 20.

FIG. 5 illustrates a lock element 21 in locking position.

Longitudinal subdivision of the fuel tube insert reduces losses of fuel tubes, because only such sections which are completely spent can be exchanged. The power required for transporting the short sections is small.

FIG. 6 illustrates a modified can whose closed end is provided with a foot portion 30 holding an element 31 which extends beyond the closed end of the can 1 and absorbs neutrons. The element 31 may be made, for example, of a substance containing boron. The free end of the element 31 is provided with a recess or cavity 32 so shaped as to afford insertion of a holding element for transporting the fuel element.

I claim:
1. A fuel element for a nuclear reactor, comprising:
   an oblong casing closed at one end,
   a plurality of fuel tubes placed substantially longitudinally of and inside said casing,
   oblong spaces between the tubes and between the tubes and said casing,
   said tubes being made substantially of fissionable material,
   said casing having an open end,
   a pipe connected to said casing at said open end thereof and extending coaxially of said casing,
   means placed in said casing at said open end and connected to said fuel tubes for uniting said fuel tubes into a common conduit extending into said pipe, and
   a coolant flowing under pressure through at least some of said spaces in one direction and through said fuel tubes in the opposite direction.

2. A fuel element as defined in claim 1 including a member made of a neutron absorbing material and rigidly connected to the outside of the closed end of said casing, said member being so constructed and arranged as to be engageable by means for transporting the casing.

3. A fuel element as defined in claim 1 wherein said coolant flows through the open end of said casing into said spaces and flows at the closed end of said casing from said spaces into said fuel tubes and leaves the latter through said pipe.

4. A fuel element as defined in claim 1 wherein
   said means placed in said casing at said open end includes a hollow conical element having a wide end connected to said pipe,
   one of said fuel tubes being placed substantially in the center of said casing and being connected to the apex of said conical element,
   the balance of said fuel tubes being placed around said tube in the center of said casing and having converging end portions connected to said conical element.

5. A fuel element for a nuclear reactor, comprising:
   an oblong casing closed at one end,
   a plurality of fuel tubes placed substantially longitudinally of and inside said casing,
   oblong spaces between the tubes and between the tubes and said casing,
   said tubes being made substantially of fissionable material,
   a corrosion-resisting coat surrounding at least a portion of each of said tubes,
   said coat having fins at the outside and longitudinal of the tube, each fin having an outer edge,
   the outer edges of fins of coats of different fuel tubes abutting one another to form a tube package having a plurality of individual coolant passages separated by said fins and extending substantially longitudinally of said fuel tubes, and
   a coolant flowing under pressure through at least some of said passages in one direction and through said fuel tubes in the opposite direction.

6. A fuel element according to claim 2 wherein said casing has an open end and said tube package forms a structural unit adapted to be inserted through said open end.

7. A fuel element according to claim 6 wherein said tubes and the package formed thereby are divided in planes normal to the longitudinal axis of the package into a plurality of individual sections, and removable locking means are provided for interlocking fins of the coats of fuel tubes of adjacent sections for interlocking adjacent sections.

8. A fuel element as defined in claim 5 wherein said fins extend radially from the fuel tubes and the fins pertaining to different tubes and having abutting edges are located in common planes.

9. A fuel element for a nuclear reactor, comprising:
an oblong casing closed at one end,
a plurality of fuel tubes placed substantially longitudinally of and inside said casing and leaving spaces between the tubes and between the tubes and said casing,
a coolant flowing through said fuel tubes in one direction and through at least some of said spaces in the opposite direction,
at least a portion of each of said tubes being placed within a corrosion-resisting coat having fins at the outside longitudinal of the tube,
fins of different tubes engaging one another to form a tube package having a plurality of coolant passages extending substantially longitudinally of the tube package,
said casing having an open end and said package being adapted to be inserted through said open end,
said tubes and the package formed thereby being divided in planes normal to the longitudinal axis of the package into a plurality of sections,
removable locking means for interlocking said sections, and
annular elements made of neutron-absorbing materials inserted in and coaxial of the opposed ends of said tube sections for maintaining axial alignment of the respective tube sections.

References Cited by the Examiner

UNITED STATES PATENTS

| | | | |
|---|---|---|---|
| 2,885,335 | 5/59 | Moore et al. | 176—77 |
| 2,902,422 | 9/59 | Hutter | 176—78 |
| 2,988,522 | 6/61 | Smith et al. | 252—478 |
| 2,992,172 | 7/61 | Blainey et al. | 75—208 |
| 3,010,889 | 11/61 | Fortescue et al. | 176—19 |
| 3,028,329 | 4/62 | Mahlmeister | 176—72 |
| 3,033,773 | 5/62 | Schluderberg et al. | 176—43 |
| 3,071,527 | 1/63 | Young | 176—52 |
| 3,089,837 | 5/63 | Moore | 176—78 |
| 3,104,219 | 9/63 | Sulzer | 176—78 |

FOREIGN PATENTS

| | | |
|---|---|---|
| 223,359 | 8/59 | Australia. |
| 1,205,890 | 2/60 | France. |
| 798,282 | 7/58 | Great Britain. |

OTHER REFERENCES

Siemens-Schuckertwerke, German application, 1,033,-808, printed July 10, 1958 (2 pp. spec., 1 sht. dwg.).

Printed application No. 1,033,808, July 1958, Germany.

CARL D. QUARFORTH, *Primary Examiner.*

REUBEN EPSTEIN, *Examiner.*

---

UNITED STATES PATENT OFFICE

CERTIFICATE OF CORRECTION

Patent No. 3,208,917            September 28, 1965

Ernst Bosshard

It is hereby certified that error appears in the above numbered patent requiring correction and that the said Letters Patent should read as corrected below.

Column 2, line 5, for "increases" read -- increase --; column 5, line 3, for the claim reference numeral "2" read -- 5 --.

Signed and sealed this 26th day of April 1966.

(SEAL)
Attest:

ERNEST W. SWIDER            EDWARD J. BRENNER

Attesting Officer            Commissioner of Patents

UNITED STATES PATENT OFFICE
CERTIFICATE OF CORRECTION

Patent No. 3,208,917　　　　　　　　　　　　　September 28, 1965

Ernst Bosshard

It is hereby certified that error appears in the above numbered patent requiring correction and that the said Letters Patent should read as corrected below.

Column 2, line 5, for "increases" read -- increase --; column 5, line 3, for the claim reference numeral "2" read -- 5 --.

Signed and sealed this 26th day of April 1966.

(SEAL)
Attest:

ERNEST W. SWIDER　　　　　　　　　　　　　EDWARD J. BRENNER
Attesting Officer　　　　　　　　　　　　　Commissioner of Patents